Sept. 5, 1933.                    O. W. BEEN                    1,925,948
                          ARCUATE THREADED BAR AND NUT
                              Filed Nov. 24, 1931
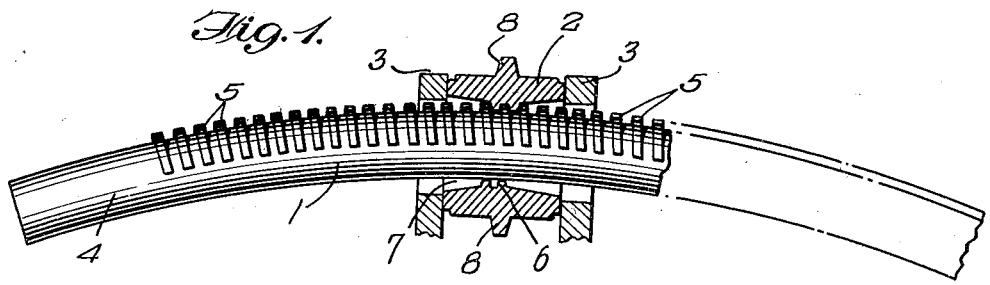
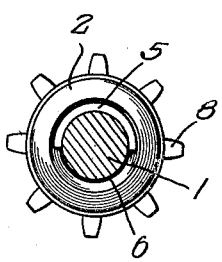   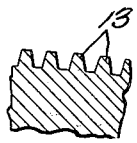
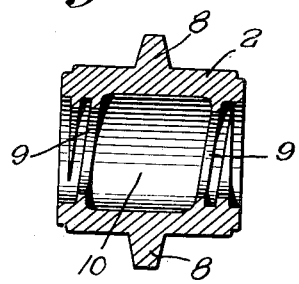   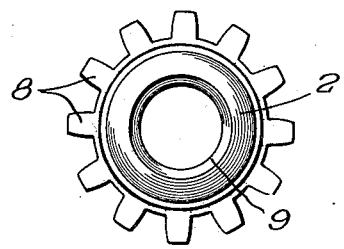
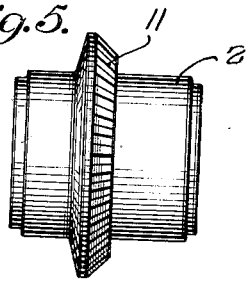   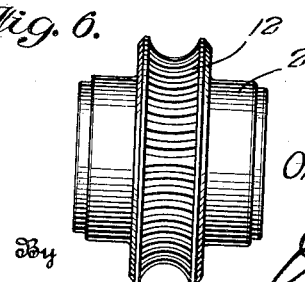
Inventor
Olof W. Been.
By E. H. Bond
Attorney Patented Sept. 5, 1933

1,925,948

UNITED STATES PATENT OFFICE 1,925,948

ARCUATE THREADED BAR AND NUT

Olof W. Been, Skanee, Mich.

Application November 24, 1931
Serial No. 577,104

5 Claims. (Cl. 74—40)

This invention relates to mechanical movements and more particularly to an improved threaded bar and operating gear, one object of the invention being to provide a structure of this character wherein the threaded bar is curved longitudinally and may be fed through an internally threaded gear by rotating the gear. Therefore the bar may shift longitudinally in an arcuate path through the gear without binding and mechanism of which the bar forms a part moved to an adjusted position.

Another object of the invention is to so form threads of the bar and gear that the gear may be easily rotated about the bar without moving longitudinally and the bar moved longitudinally through the gear without binding.

Another object of the invention is to provide a device of this character which is extremely simple in construction and very efficient in operation.

The invention is illustrated in the accompanying drawing wherein

Figure 1 is a view showing the bar in elevation and the adjusting gear or nut in section.

Figure 2 is a view showing the bar in cross section and the gear in end elevation.

Figure 3 is a longitudinal sectional view through a modified form of gear.

Figure 4 is an end elevation of the gear shown in Fig. 3.

Figure 5 is a side elevation of another modified form of gear.

Figure 6 is a view showing another modified form of gear in elevation.

Figure 7 is a fragmentary sectional view of a modified form of shaft.

The bar 1 and adjusting gear 2 constituting the subject matter of this invention may be embodied in a number of specific uses. The bar could be an arcuate bar at the inner end of a pivoted tongue forming part of a draft appliance and the gear rotatably mounted between abutment plates or bearings 3 to prevent longitudinal shifting of the gear, or the bar could be the cross bar of a pair of calipers or similar instrument wherein the bar has one end rigidly attached to an arm of the instrument and engages through a nut carried by the other arm so that by rotating the nut the arms may be moved towards or away from the other.

The bar may be of any length and diameter found necessary according to the uses to which it is to be put and may have its end portions unthreaded as shown at 4 and of any shape desired in order that one or both ends may be secured to companion parts of a draft appliance or other apparatus. The bar is curved longitudinally and formed with parallel teeth or threads 5 which extend substantially half way around the shaft as shown in Fig. 2 and occupy the outer peripheral portion of the shaft as shown in Fig. 1. The arcuate bar shown in Fig. 1 could represent a segment of a steering wheel in which case the wheel could be threaded entirely about its circumference and the gear or sleeve rotatably mounted in any desired manner.

The gear is in the form of a sleeve of suitable length and diameter and in the form shown in Figures 1 and 2 is provided intermediate its length with internal threads 6 which mesh with the threads or teeth 5 of the shaft. The bore 7 of the gear tapers from its ends towards the threads 6 thereby forming the bore with flaring end portions and permitting the curved bar to move longitudinally through the gear without binding. Sprocket teeth 8 are formed about the gear intermediate its ends in order that rotary motion may be transmitted to the gear through the medium of a sprocket chain. If the bar forms part of a pair of calipers the gear will be rotatably mounted in an opening formed in one arm thereof and may be provided with a head at its outer end in order that it may be easily turned.

In the form shown in Figures 3 and 4, the gear is similar to that shown in Figures 1 and 2 except that it is formed with internal threads 9 near its ends and the bore 10 instead of tapering inwardly from its ends has its portion between the threads of an increased diameter. Therefore the curvature of the bar between the threads 9 will be accommodated and binding will not take place when the bar is moved longitudinally.

Instead of providing the gear with teeth 8 for engagement by a sprocket chain it may be formed with a ring 11 having beveled teeth upon one side as shown in Fig. 5, or it may be provided with a worm ring 12 as shown in Fig. 6. Therefore a beveled gear or worm carried by a drive shaft rotated from a suitable source of power may be employed to transmit rotary motion to the gear or sleeve 2.

The teeth or threads upon the shaft may be of an even depth or they may be of the type shown at 13 in Fig. 7. In either instance they must extend about the shaft parallel to each other and may be formed either before or after the shaft is bent to assume is longitudinal curvature. If formed before the shaft is curved they must have their side faces machined after the bending operation has been performed, as otherwise they would converge toward their ends and binding would take place between threads of the gear and shaft.

In some cases the nut may be driven with a straight gear.

Modifications in detail may be resorted to without departing from the spirit of the invention or sacrificing any of its advantages.

For instance, the bar may be in the form of a full circle, if desired. This can be readily performed by carrying the circle around in a sleeve, or, more preferably, in a groove. For instance, I may employ a circular plate, metal by preference, with a groove on its outer edge to conform to the smooth side of the bar in the inner side of the circle, and a cut-out portion in the edge of the plate for the nut to operate in.

Again, an outer plate may be arranged with a series of lugs, or dogs that would engage with the threads of the bar, and release as the nut progresses and engage as the nut has passed.

What is claimed is:—

1. In a mechanical movement, a bar curved longitudinally and threaded for a portion of its circumference, the threads extending about the outer peripheral portion of the bar, and a cylindrical actuating element rotatably engaged about the bar and formed intermediate its ends with internal threads meshing with threads of the bar.

2. In a mechanical movement, a bar curved longitudinally and threaded for a portion of its circumference, the threads extending about the outer peripheral portion of the bar, and a cylindrical actuating element rotatably engaged about the bar and formed intermediate its ends with internal threads meshing with threads of the bar, the bore of the actuating element increasing in diameter towards its end.

3. In a mechanical movement, a bar curved longitudinally and threaded for a portion of its circumference, the threads extending about the peripheral portion of the bar, and a cylindrical actuating element rotatably engaged about the bar and having its end portions formed with internal threads meshing with threads of the bar and the intermediate portion of its bore unthreaded and of increased diameter.

4. A mechanical movement embodying a member curved longitudinally and having a portion only of its circumference threaded, the threads extending substantially only one half around said member, and a cylindrical actuating member embracing said first-named member and having threads engaging the threaded portion of said first-named member.

5. In a device of the character stated, a bar and an adjusting gear, the bar being of arcuate form with teeth extended only partially about its periphery, and an adjusting gear having internal threads meshing with the threads embracing said bar.

OLOF W. BEEN.